US011522988B2

(12) United States Patent
Hughes et al.

(10) Patent No.: US 11,522,988 B2
(45) Date of Patent: Dec. 6, 2022

(54) OBJECT HOLDER WITH QUICK-RELEASE ANCHORING CAPABILITY

(71) Applicant: Mighty Ventures, Inc., Rahway, NJ (US)

(72) Inventors: Jonathan Hughes, Wyndmoor, PA (US); Israel Harry Zimmerman, Los Angeles, CA (US)

(73) Assignee: Mighty Ventures, Inc., Rahway, NJ (US)

( * ) Notice: Subject to any disclaimer, the term of this patent is extended or adjusted under 35 U.S.C. 154(b) by 32 days.

(21) Appl. No.: 17/301,668

(22) Filed: Apr. 9, 2021

(65) Prior Publication Data

US 2022/0329679 A1   Oct. 13, 2022

(51) Int. Cl.
| | |
|---|---|
| *H04M 1/04* | (2006.01) |
| *F16M 13/02* | (2006.01) |
| *F16M 13/00* | (2006.01) |
| *F16B 47/00* | (2006.01) |

(52) U.S. Cl.
CPC ............... *H04M 1/04* (2013.01); *F16B 47/00* (2013.01); *F16M 13/005* (2013.01); *F16M 13/022* (2013.01)

(58) Field of Classification Search
CPC .............................. F16B 47/00; F16M 13/022
USPC ............ 248/205.5, 467, 205.8, 206.2, 206.3, 248/309.3, 362, 363
See application file for complete search history.

(56) References Cited

U.S. PATENT DOCUMENTS

| | | | |
|---|---|---|---|
| 1,518,943 | A | 12/1924 | Story |
| 1,753,611 | A | 4/1930 | Lower |
| 1,778,175 | A | 10/1930 | Thune |

(Continued)

FOREIGN PATENT DOCUMENTS

| | | |
|---|---|---|
| CN | 1079886 A1 | 12/1993 |
| CN | 203987324 U | 12/2014 |

(Continued)

OTHER PUBLICATIONS

Zimmerman, "List of patents or Patent Applications Treated as Related", Apr. 4, 2022, 2 pages.

(Continued)

*Primary Examiner* — Muhammad Ijaz
(74) *Attorney, Agent, or Firm* — Walter W. Duft

(57) ABSTRACT

An object holder with quick-release anchoring capability includes an object carrier having an object carrier base. A vacuum release actuator on the object carrier base is displaceable to separate from the object. An anchor member carried by vacuum release actuator includes outer and inner seal members and an interconnecting vent port. The outer and inner seal members are arranged to form substantially airtight seals with the reference surface and the object, respectively, that define controlled pressure zones. The vent port extends between the outer and inner controlled pressure zones. The inner seal member has a substantially non-folding configuration that prevents excessive seal elongation prior to separation from the object. During operation, the controlled pressure zones can be vented by manipulating the object carrier away from the reference surface to separate the object and the vacuum release actuator until the inner seal member breaks its substantially airtight seal with the object.

20 Claims, 10 Drawing Sheets

(56) References Cited

U.S. PATENT DOCUMENTS

| | | |
|---|---|---|
| 1,840,400 A | 1/1932 | Lebherz |
| 2,083,299 A | 6/1937 | Hunter |
| 2,233,870 A | 3/1941 | Muter |
| 2,542,400 A | 2/1951 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,726,553 A | 2/1988 | Wischusen, III |
| 4,756,497 A * | 7/1988 | Lan .................. F16B 47/00 248/346.11 |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,192,043 A | 3/1993 | Fa |
| 5,207,076 A | 5/1993 | Sciarrillo |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin et al. |
| D357,170 S | 4/1995 | Wellsfry |
| 5,413,302 A | 5/1995 | Ferster |
| 5,511,752 A | 4/1996 | Frethewey |
| 5,531,353 A | 7/1996 | Ward et al. |
| 5,667,180 A | 9/1997 | Duckworth |
| 5,742,971 A | 4/1998 | Salinger |
| D397,915 S | 9/1998 | McNaughton |
| D400,763 S | 11/1998 | Taylor et al. |
| 5,992,806 A | 11/1999 | Adams |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,666,420 B1 | 12/2003 | Carnevali |
| 6,745,987 B2 | 6/2004 | Rousselet et al. |
| 6,776,368 B1 | 8/2004 | Duncan et al. |
| 6,895,642 B2 | 5/2005 | Huang |
| 7,090,183 B2 | 8/2006 | Heybl et al. |
| 7,201,285 B2 | 4/2007 | Beggins |
| 7,306,113 B2 | 12/2007 | El-Saden et al. |
| 7,458,541 B1 | 12/2008 | Chang |
| 7,481,329 B2 | 1/2009 | Camp, Jr. |
| 7,726,715 B2 | 6/2010 | Nagasawa et al. |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,757,418 B2 | 6/2014 | Zimmerman |
| 9,521,919 B1 | 12/2016 | Reyes |
| 9,651,229 B1 | 5/2017 | Huang |
| 9,801,483 B2 | 10/2017 | D'Alesio |
| 9,814,332 B2 | 11/2017 | Zimmerman |
| 10,520,009 B2 | 12/2019 | Smith et al. |
| 11,255,482 B1 | 2/2022 | Zimmerman |
| 2002/0130133 A1 | 9/2002 | Immerman et al. |
| 2003/0075666 A1 | 4/2003 | Dunchock |
| 2003/0102320 A1 | 6/2003 | Park |
| 2004/0238541 A1 | 12/2004 | Camp, Jr. |
| 2004/0238542 A1 | 12/2004 | Camp, Jr. et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2010/0155550 A1* | 6/2010 | Weiss-Vons ............ F16B 47/00 248/363 |
| 2012/0287560 A1 | 11/2012 | Fan |
| 2014/0171157 A1 | 6/2014 | Ho |
| 2014/0326630 A1 | 11/2014 | Henry |
| 2015/0230638 A1 | 8/2015 | Jagger |
| 2018/0149302 A1* | 5/2018 | Papapanos ........... F16M 13/022 |
| 2019/0022874 A1* | 1/2019 | Mutch .................. B25J 15/0675 |
| 2019/0024699 A1* | 1/2019 | Mutch .................... A47G 19/10 |
| 2019/0203759 A1* | 7/2019 | Zimmerman ........... A47L 13/16 |
| 2020/0400267 A1 | 12/2020 | Garza |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |
| CN | 105996687 A | 10/2016 |
| DE | 3742636 | 1/1989 |
| EP | 1649788 | 4/2006 |
| JP | H05187430 A | 7/1993 |
| JP | 2000104724 A | 4/2000 |
| JP | 2003501315 | 1/2003 |
| JP | 2004160079 | 10/2004 |
| JP | 2006314739 | 11/2006 |
| JP | 2014173709 A | 9/2014 |
| WO | WO2012008942 | 1/2012 |
| WO | WO2019097212 A1 | 5/2019 |

OTHER PUBLICATIONS

KIPO, PCT International Search Report, PCT International Application No. PCT/2022/070932 entitled "Object Holder, Handheld Electronic Device Case, and Universal Vacuum Connector With Quick-Release Anchoring Capability", Jul. 11, 2022, 3 pages.

Kipo, Written Opinion Of The International Searching Authority, PCT International Application No. PCT/2022/070932 entitled "Object Holder, Handheld Electronic Device Case, And Universal Vacuum Connector With Quick-Release Anchoring Capability", Jul. 11, 2022, 9 pages.

* cited by examiner

FIG. 1
FIG. 2
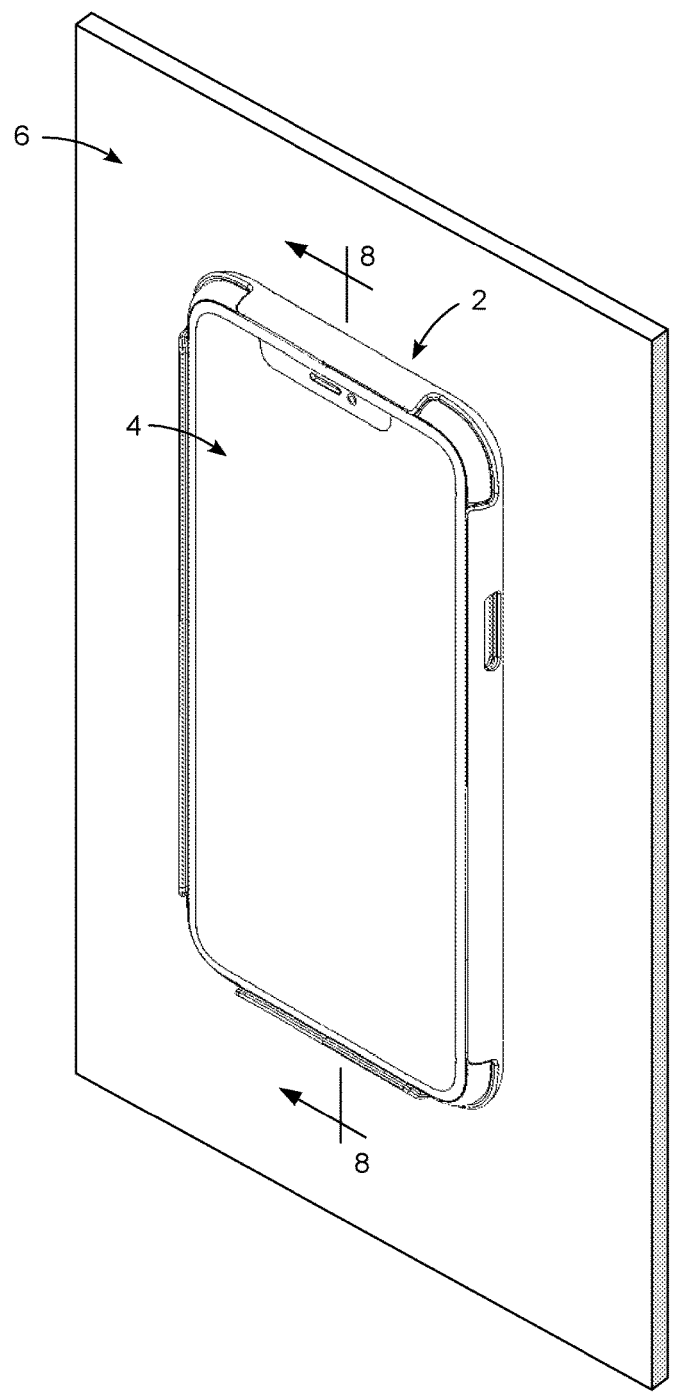
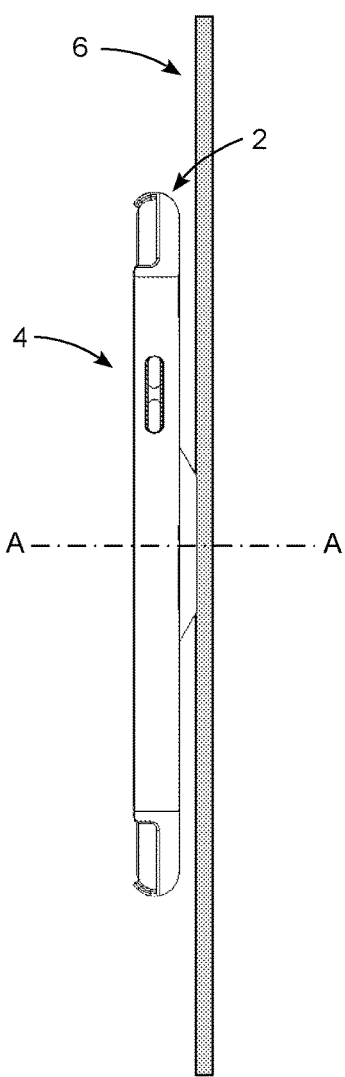

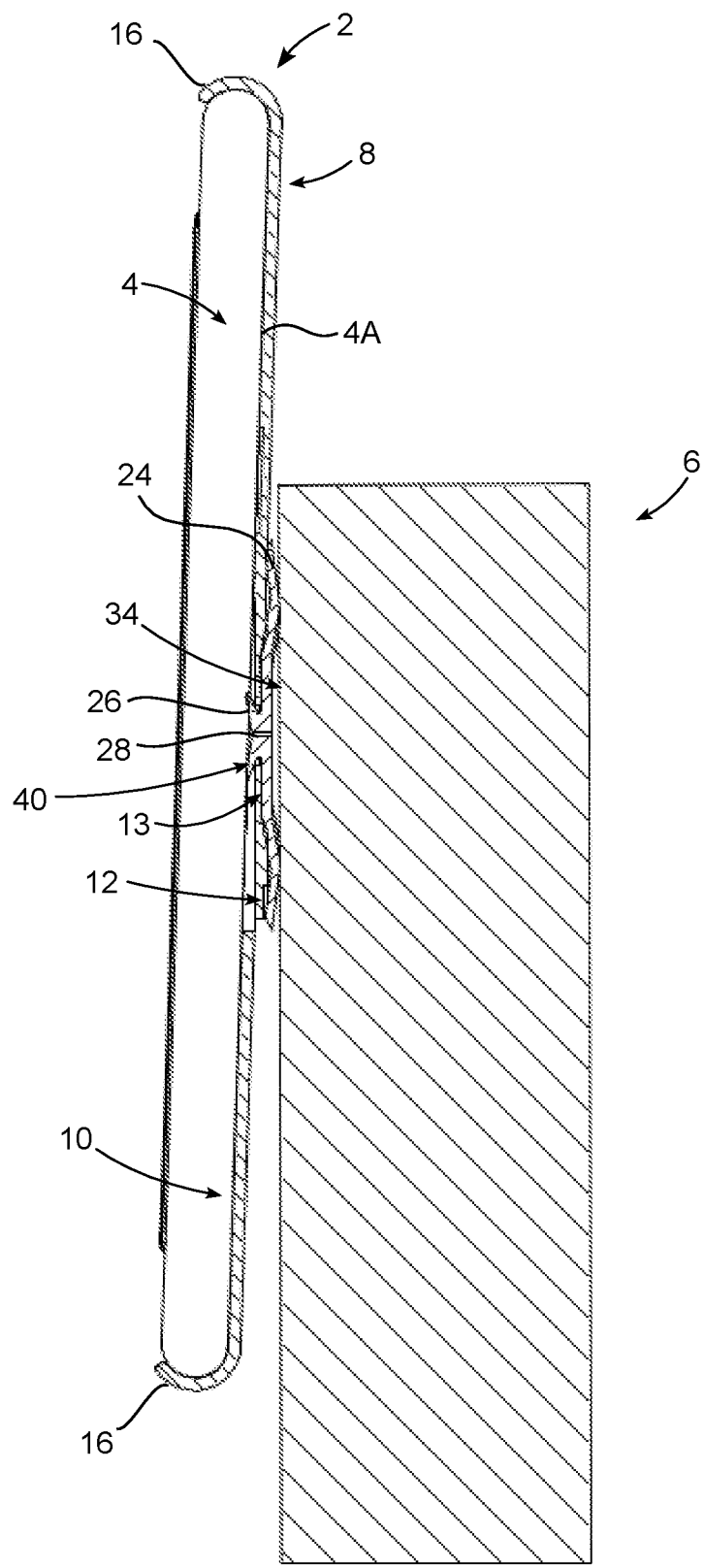

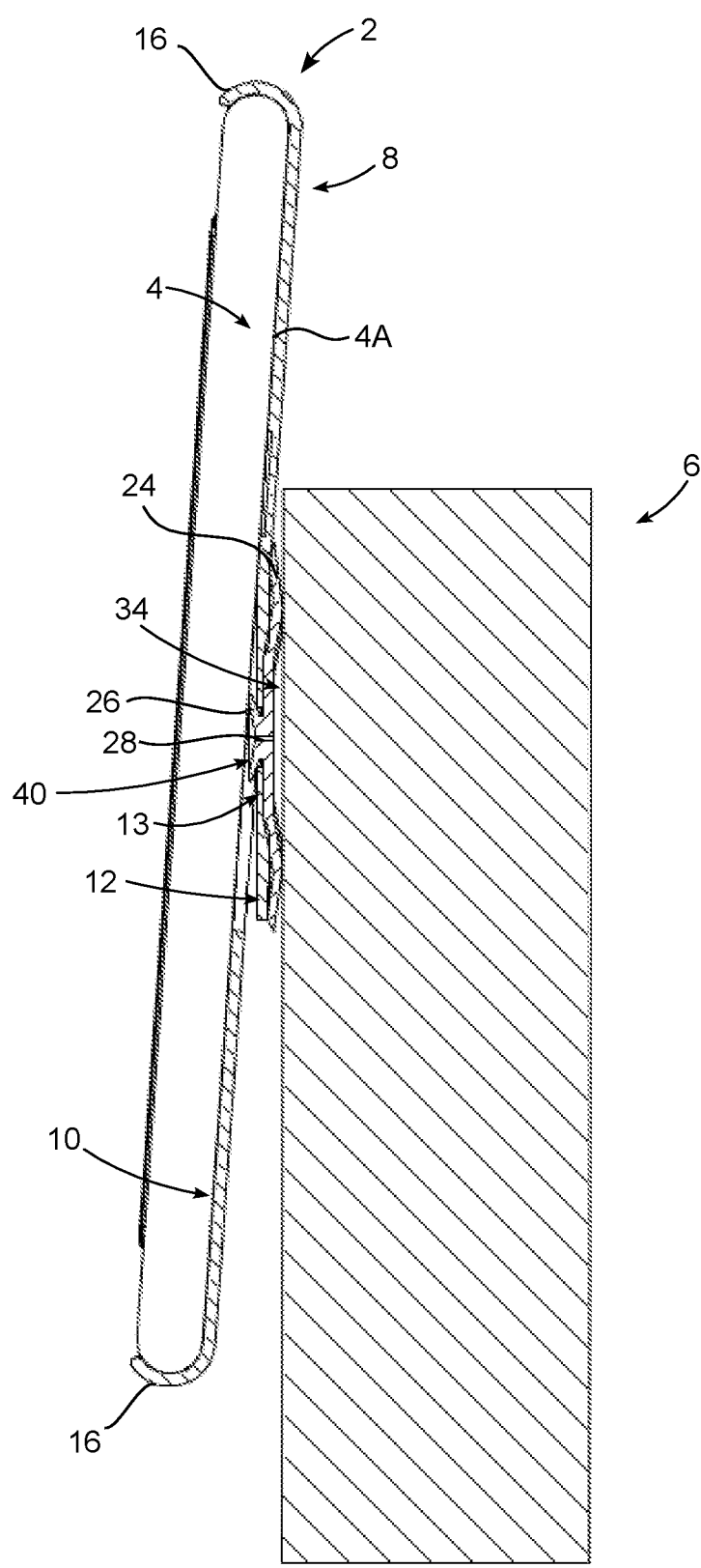

OBJECT HOLDER WITH QUICK-RELEASE ANCHORING CAPABILITY

BACKGROUND

1. Field

The present disclosure relates to anchoring apparatus for releasably securing objects to surfaces. More particularly, the disclosure concerns anchoring apparatus with anchor members that adhere to surfaces by way of differential pressure when flexed. Still more particularly, the disclosure pertains to an object holder with quick-release differential pressure anchoring capability.

2. Description of the Prior Art

By way of background, anchoring apparatus that operate by way of differential pressure are known. Such apparatus often utilize anchor members such as suction cups and suction seal stabilizers. A suction cup typically includes a flexible seal member configured as an elastomeric cup-shaped structure having a concave side and a relatively soft peripheral rim. In order to adhere the suction cup to a reference surface, the seal member must be affirmatively flexed by pressing it against the reference surface with enough force to temporarily flatten the concave lower side so that air is expelled outside the peripheral rim. When the pressing force is released, the seal member has a natural tendency to return to its initial configuration. As this rebounding occurs, the volumetric cavity that lies inside the peripheral rim between the seal member's lower side and the reference surface begins to enlarge. This in turn causes the air pressure in the volumetric cavity to proportionately decrease in accordance with Boyle's Law. A negative pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the seal member to its initial configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the seal member's peripheral rim and the reference surface.

Some suction cups are designed so that they can only be removed from the reference surface by applying sufficient brute force to break the seal formed by the seal member's peripheral rim, or by peeling up the rim to create a small opening that vents the volumetric cavity. Other suction cups are designed with a vent port and are used with a mechanical stopper made of rigid (or semi-rigid) material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a seal member that operates somewhat similarly to a suction cup's seal member, but is typically less concave, or even flat, and usually made from a softer more resilient material. Alternatively, the seal member of a suction seal stabilizer may be constructed of the same material as a suction cup seal member, but is thinner and more flexible than its suction cup counterpart. When a properly designed suction seal stabilizer is placed on a reference surface, little or no pushing force needs to be applied to flatten the seal member. Such devices are thus generally self-sealing (self-anchoring). Because the seal member is usually highly flexible and may have little or no concavity, its elastic rebound forces may be relatively weak. If the seal member remains substantially flat against the reference surface with little or no rebound occurring, the suction forces will be negligible or non-existent until the anchoring apparatus is acted upon by a load. If the reference surface is substantially horizontal, the load that generates suction forces may be a lifting or tilting load applied to the anchoring apparatus or an item being carried thereby.

In a typical suction seal stabilizer, a vent port is provided for releasing the stabilizer from the reference surface. In such designs, an anchoring apparatus that incorporates the suction seal stabilizer may include a movable component that acts as a mechanical stopper to open and close the vent port. The movable component may be configured to carry an item or material that is to be anchored by the anchoring apparatus. Displacing the component away from the vent port causes the vent port to open, allowing the anchoring apparatus to be moved away from the reference surface without appreciable resistance. This provides a form of stealth mode operation in which the user is not aware of the action of the suction seal stabilizer. When the anchoring apparatus is placed back onto the reference surface, the movable auxiliary component will reengage the vent port, thereby "arming" the suction seal stabilizer into a stabilizing mode.

It is to improvements in the design of anchoring apparatus having anchor members embodied as suction cups or suction seal stabilizers that the present disclosure is directed. More particularly, the present disclosure provides an anchoring apparatus embodied as an object holder that holds an object for quick-release anchoring to a reference surface.

SUMMARY

An object holder with quick-release anchoring capability includes an object carrier configured to hold an object while maintaining a fixed positional relationship therewith. The object carrier includes an object carrier base. A vacuum release actuator is disposed on the object carrier base and is displaceable relative to the object carrier base in order to separate from the object along an axis that extends normal to the reference surface. An anchor member is carried by the vacuum release actuator. The anchor member includes a flexible outer seal member, a flexible inner seal member, a hub on which the outer seal member and the inner seal member are disposed, and an interconnecting vent port extending through the hub. The outer seal member is arranged to engage the reference surface and form a substantially airtight seal therewith that defines an outer controlled pressure zone, the outer controlled pressure zone including a region located between the outer seal member and the reference surface. The inner seal member is arranged to engage the object and form a substantially airtight seal therewith that defines an inner controlled pressure zone, the inner controlled pressure zone including a region located between the inner seal member and the object. The vent port has an outer end in fluid communication with the outer controlled pressure zone and an inner end in fluid communication with the inner controlled pressure zone. The hub is comparatively axially incompressible and non-elongatable relative to the outer seal member and the inner seal member. The inner seal member has a substantially non-folding configuration that prevents axial elongation that would otherwise occur as result of seal member unfolding during operation of the object holder. During operation, the object holder holds the object and mounts to the reference surface by virtue of the controlled pressure zones maintaining a negative pressure differential relative to an external ambient pressure. The controlled pressure zones can be vented by manipulating the object carrier away from the reference surface to separate the object and the vacuum release actuator until the inner seal member breaks its substantially airtight seal with the object.

BRIEF DESCRIPTION OF THE DRAWINGS

The foregoing and other features and advantages will be apparent from the following more particular description of example embodiments, as illustrated in the accompanying Drawings.

FIG. 1 is a front perspective view showing an assembly formed by an example embodiment of an object holder with quick-release anchoring capability that carries an object and mounts it a reference surface.

FIG. 2 is a side view of the assembly of FIG. 1.

FIG. 8B is a cross-sectional view corresponding to FIG. 8A, showing a first stage of object holder detachment in which the object holder and the object held thereby have undergone initial movement away from the reference surface.

FIG. 8C is a cross-sectional view corresponding to FIG. 8A, showing a second stage of object holder detachment in which of the object holder and the object held thereby have undergone further movement away from the reference surface.

DETAILED DESCRIPTION OF EXAMPLE EMBODIMENTS

Figure 3:
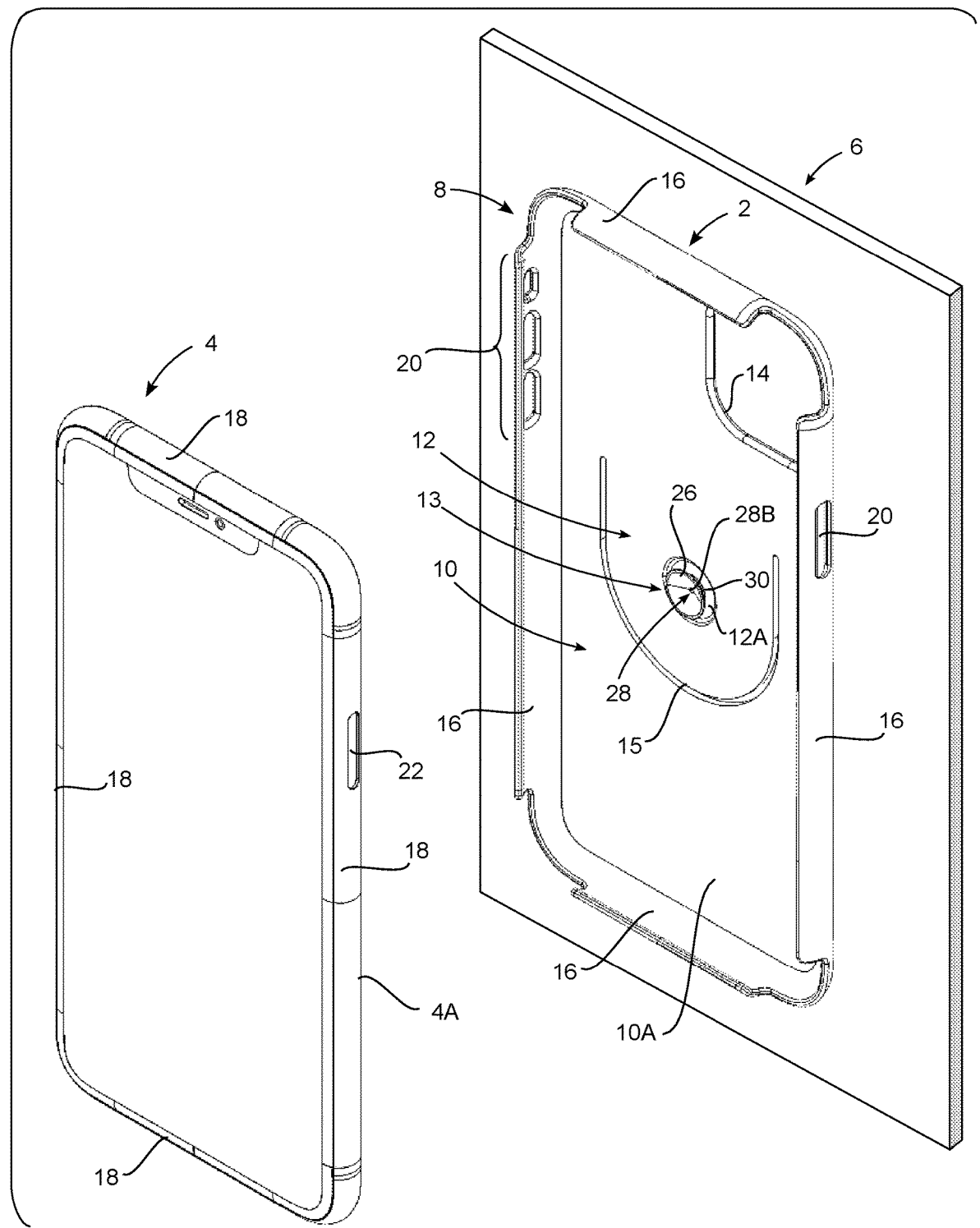
FIG. 3 is an exploded front perspective view showing the object, object holder and reference surface of FIG. 1.

Turning now to the drawing figures, in which like reference numbers illustrate like structure in all of the several views, FIGS. 1-2 illustrate one possible embodiment of an object holder 2 having quick-release anchoring capability that may be constructed in accordance with the present disclosure. The object holder 2 is designed to hold an object 4 for detachable mounting to an external reference surface 6. In the illustrated embodiment, the object 4 is depicted as a smartphone or other handheld electronic device and the object holder 2 is a case for the object (e.g., a smartphone case). However, alternate embodiments of the object holder 2 may be constructed in accordance with the principles of the present disclosure for holding and detachably mounting many other kinds of objects.

In the illustrated embodiment, the reference surface 6 is shown as being vertical. However, the object holder 2 could just as easily be used to mount the object 4 to horizontal reference surfaces or to inclined reference surfaces oriented at any arbitrary angle lying between vertical and horizontal.

It will be appreciated that the types of reference surfaces on which the object 4 may be mounted using the object holder 2 are virtually unlimited. As described in more detail below, the only requirement for a suitable reference surface is that it be capable of forming a suction seal with the object holder 2. Without limitation, examples of possible reference surfaces include walls, doors, windows, appliances, cabinetry, desks, tables, shelves, counters, surfaces located on or within transportation equipment, such as landcraft, aircraft or watercraft, and many others.

Figure 4:
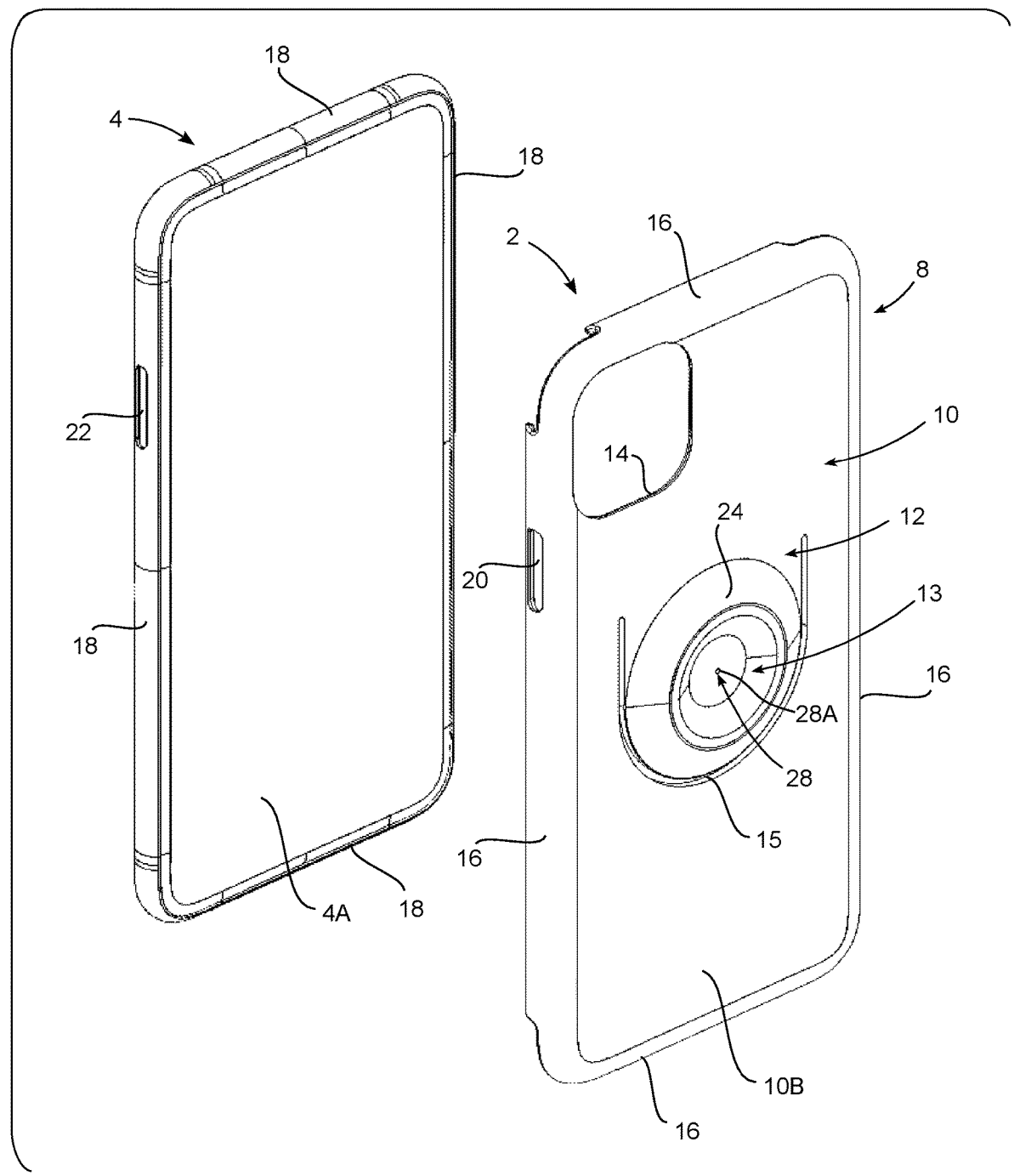
FIG. 4 is an exploded rear perspective view showing the object and object holder of FIG. 1.

With additional reference now to FIGS. 3 and 4, the object holder 2 includes an object carrier 8 that may be constructed from any material having desired rigidity (e.g., rigid, semi-rigid, non-rigid), including but not limited to a plastic such as polypropylene or polyurethane, a composite material such as carbon fiber, a metal such as titanium or aluminum, an elastomeric material such as silicone rubber, leather or synthetic leather, and or even wood or wood laminate.

The object carrier 8 is configured to hold the object 4 while maintaining a fixed positional relationship therewith. In other words, the object carrier 8 as a whole does not move relative to the object 4 while the latter is being held by object holder 2. The object 4 and the object carrier 8 move in unison with each other. When one moves, the other moves, and visa versa.

The object carrier 8 includes an object carrier base 10 arranged for interposition between the object 4 and the reference surface 6 when the object is mounted to the reference surface using the object holder 2. A vacuum release actuator 12 is disposed on the object carrier base 10, and carries a double-seal flexible anchor member 13 that provides vacuum (suction) mounting capability. The vacuum release actuator 12 is displaceable relative to the object carrier base in order to separate therefrom, and from the object 4 itself, along an axis A-A (see FIG. 2) that extends normal to the reference surface 6.

In the illustrated embodiment wherein the object 4 is a smartphone or other handheld electronic device, the object carrier base 10 may be configured as a plate or other substantially planar structure having an inner side 10A (FIG. 3) arranged to face the object and an outer side 10B (FIG. 4) arranged to face the reference surface 6. In this configuration, the object carrier base 10 is substantially completely interposed between the object 4 and the reference surface 6. With the exception of one or more optional openings or other discontinuities in the object carrier base 10, the object carrier base may be formed as a solid unbroken sheet of material whose interior side 10A may extend across substantially an entire rear side 4A of the object 4 that faces the reference surface 6.

One example of an optional opening or discontinuity that may be provided in the object carrier base 10 is an opening 14 that provides access to a functional component of object 4, in this case an array of one or more smartphone rear cameras. Another example of an optional opening or discontinuity that may be provided in the object carrier base 10 is a U-shaped discontinuity 15 that may be formed as a slot (or slit) to define the vacuum release actuator 8. This construction is described in more detail below.

The object carrier 8 may further include one or more object holding elements 16 arranged around the periphery of the object carrier base 10. Four object holding elements 16 are shown in FIGS. 3 and 4. In the illustrated embodiment, the object holding elements 16 are flexible structures that may be integrally formed with the object carrier base 10. The object holding elements 16 are angled out-of-plane relative to a major surface portion of the object carrier base, namely the major surface defined by the inner side 10A that faces the object 4 and the outer side 10B that faces the reference surface 6. This allows the object holding elements 16 to engage, grip and hold the side edges 18 of the object 4, which are generally orthogonal to (and do not face) the reference surface 6. In this way, the object carrier 8 may be firmly secured to the object 4. A smartphone's side edges typically have a curved profile. Thus, in the illustrated embodiment, the interior surfaces of the object holding elements 16 may likewise have a curved profile that matches the smartphone's edge profile. Like the object carrier base 10, some or all of the object holding elements 16 may be formed with one or more openings or other discontinuities that provide access to corresponding portions of the object 4. For example, the illustrated embodiment depicts optional openings 20 in two of the object holding elements 16. These optional openings 20 provide access to various smartphone function control buttons, such as the power button 22.

It should be understood that the above-described configuration of the object carrier 8 represents only one possible embodiment of the disclosed subject matter. In alternate embodiments, the object carrier 8 could have various other configurations. These other configurations may depend in whole or in part on the configuration of the object 4 being carried. For example, although the object carrier base 10 is substantially planar in the illustrated embodiment (due to the object 4 being a smartphone), non-planar (e.g., curved) configurations are also envisioned. Similarly, although the object carrier base 10 is shown as being relatively thin between its inner side 10A and its outer side 10B (as compared to its length and width dimensions), this is not a requirement.

The object carrier base 10 also need not be substantially solid (i.e., with only minor openings or discontinuities). In alternate embodiments, the object carrier base 10 could be a substantially discontinuous structure. One example of a discontinuous object carrier base construction would be a honeycomb web or other mesh-like or screen-like structure that includes a pattern of perforations. Another example of a discontinuous object carrier base construction would be a truss structure formed by any number of small beam-like or girder-like elements suitably arranged to support the object 4. Possible truss configurations a two-element X-shaped structure, a three-element Y-shaped structure, a three-element H-shaped structure, etc.

In still further alternate embodiments, the object carrier 8 could be formed with an object carrier base 10 but no sidewalls 16 for gripping and holding the object 4. In that case, the object carrier base 10 could be removably (or permanently) mounted to the object 4 using fasteners, adhesive bonding, or other techniques.

With continuing reference to FIGS. 3-4, the vacuum release actuator 12 may be disposed proximate to a central portion of the object carrier base 10. Alternatively, the vacuum release actuator 12 may be formed at an off-center location. In the illustrated embodiment, the vacuum release actuator 12 is integrally formed on the object carrier base 10 as a generally U-shaped flap (with other flap configurations also being possible). The flap is created by the previously-mentioned U-shaped slot 15 that represents a discontinuity in the object carrier base 10. By virtue of its flap construction, the vacuum release actuator 12 may be thought of as being formed by a flexible portion the object carrier base 10, the remainder of which may be comparatively non-flexible. More specifically, the vacuum release actuator 12 may be thought of as representing a pivotable or bendable portion of the object carrier base 10.

Although not shown, alternate embodiments could utilize other constructions to implement the vacuum release actuator 13. Thus, the vacuum release actuator 12 need not be integrally formed on the object carrier base 10, and need not be formed as a flap or other pivotable or bendable structure. It could, for example, be formed a linearly movable member, such as a disk, that resides in an opening formed in the object carrier base 10 and is movably attached thereto using a suitable flexible connector configuration. If the vacuum release actuator 12 is integrally formed with the object carrier base 10, the flexible connectors could be living hinges. If the vacuum release actuator 12 is not integrally formed with the object carrier base 10, other types of flexible connectors could be used.

In still other alternate embodiments, the vacuum release actuator 12 might not be a definitively-formed element at all. For example, if the object carrier base 10 is formed from a sufficiently flexible material, and if it is thin enough so that a central portion thereof can flex and displace out-of-plane relative to an edge portion thereof (i.e., along axis A-A of FIG. 1), the flexing and displaceable central portion could serve as the vacuum release actuator 12.

Figure 5:
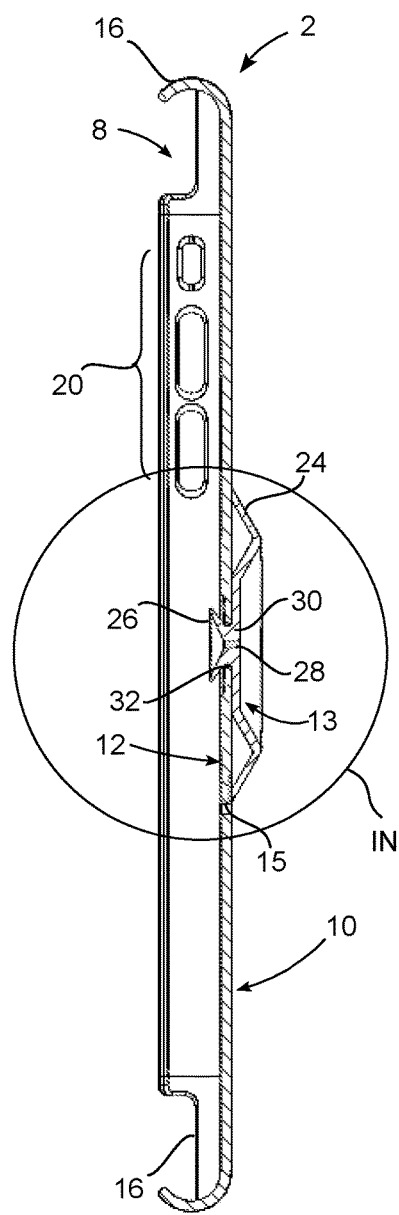
FIG. 5 is a vertical cross-sectional centerline view of the object holder of FIG. 1.
Figure 6:
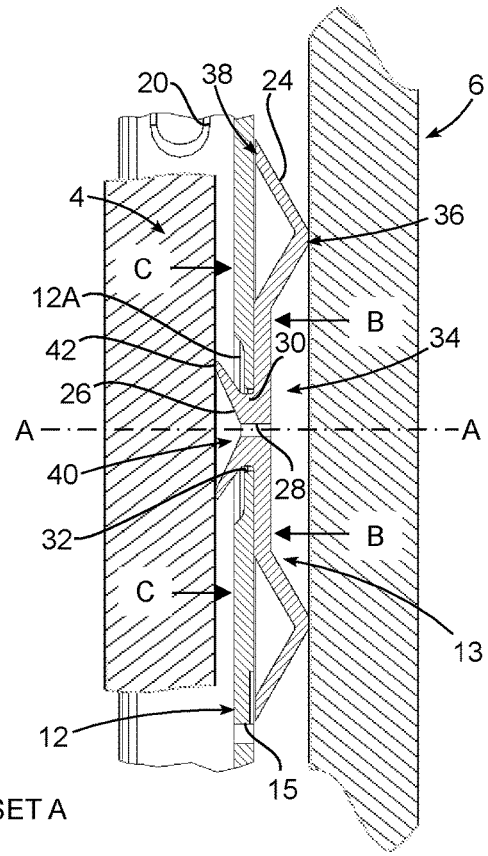
FIG. 6 is an enlarged vertical cross-sectional centerline view depicting the structure shown in Inset A of FIG. 5.

With continuing reference to FIGS. 3-4, and with additional reference also to FIGS. 5-6, the anchor member 13 includes a flexible outer seal member 24, a flexible inner seal member 26, and an interconnecting vent port 28. In the illustrated embodiment, the anchor member 13 further includes a central hub 30 disposed between the outer seal member 24 and the inner seal member 26. The central hub 30 may be used to mount the anchor member 13 to the vacuum release actuator 12. In particular, as best shown in FIGS. 3 and 6, the central hub 30 of the anchor member 13 may be seated in a through-bore or other opening 32 formed in the vacuum release actuator 12. In the illustrated embodiment, the anchor member 13, including the outer seal member 24, the inner seal member 26, and the central hub 30, may be formed of a flexible resilient material having an appropriate hardness and density. Silicone rubber represents one such material. Other resilient materials may also be used.

Figure 7:
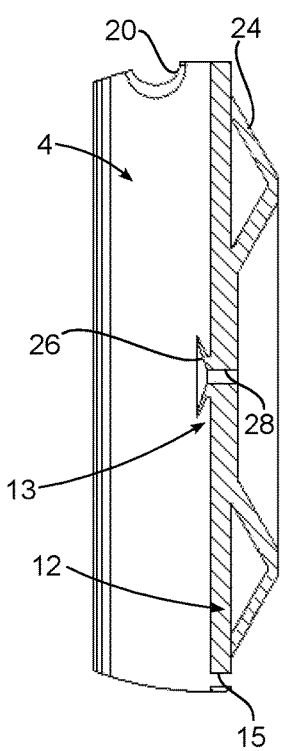
FIG. 7 is an enlarged vertical cross-sectional centerline view depicting a modified version of the structure shown in Inset A of FIG. 5.

In an alternate embodiment, instead of forming the anchor member 13 as a discrete component that is mounted to the vacuum release actuator 12, the anchor member could be integrally formed therewith. This is shown in FIG. 7. In that case, the central hub 30 of the anchor member 13 may be integrated with the structure that forms the vacuum release actuator 12. This means that the vacuum release actuator 12 and the anchor member 13 will be formed from the same material. In the event that the vacuum release actuator 12 is integrally formed as part of the object carrier base 10, the object carrier base or even the entire object carrier 8 itself may likewise be formed of the same material as both the vacuum release actuator and the anchor member 13. For example, silicone rubber of suitable hardness and density may be used to form a unitary injection-molded structure that provides the anchor member 13, the vacuum release actuator 12, and the object carrier base 10 or the entire object carrier 8.

As best shown in FIG. 6, the outer seal member 24 is arranged to engage the reference surface 6 and form a substantially airtight seal therewith that defines an outer controlled pressure zone 34. For ease of illustration, FIG. 6 depicts the outer seal member 24 in its initial undeformed state at a point where the object holder 2 makes initial contact with the reference surface 6 during mounting. As shown by the arrows labeled "B," the final mounted position of the object holder 2 may place the reference surface 6 closer to the hub 30 of the anchor member 13. The outer controlled pressure zone 34 represents the enclosed airspace region located between the outer seal member 24 and the reference surface 6. In the illustrated embodiment the outer seal member 24 is shown as being cup-shaped, which allows the outer seal member to function as suction cup or a suction seal stabilizer, depending on the stiffness of the material and the axial force required to adhere it to the reference surface 6. In alternate embodiments, the outer seal member 26 might not be cup-shaped, and could be substantially flat, if so desired, even when the object holder 2 is in an unmounted state. In the illustrated embodiment, the periphery of the controlled pressure zone 34 is defined by a circular ring of contact where an axially protruding medial rim 36 of the outer seal member 24 makes suction contact with the reference surface 6. For aesthetic reasons, the medial rim 36 may be situated radially inboard from a circumferential outer edge 38 of the outer seal member 24. The outer edge 38 is axially offset from medial rim 36 so as to form an axially inverted radial outer cup configured so that the outer edge lies against the outer surface of the vacuum release actuator 12. In the illustrated embodiment, the outer edge 38 is axially situated proximate to the outer surface of the vacuum release actuator 12.

The inner seal member 26 is arranged to engage the object 4 and form a substantially airtight seal therewith that defines an inner controlled pressure zone 40. For ease of illustration, FIG. 6 depicts the inner seal member 26 in its initial undeformed state at a point where the object 4 makes initial contact with the reference surface 6 during attachment of the object to the object carrier 8. As shown by the arrows labeled "C," the final installed position of the object 4 may place the object closer to the hub 30 of the anchor member 13. The inner controlled pressure zone 40 represents the enclosed air-space region located between the outer seal member 24 and the reference surface 6. In the illustrated embodiment the inner seal member 26 is shown as being cup-shaped, which allows the inner seal member to function as suction cup or a suction seal stabilizer, depending on the stiffness of the material and the axial force required to adhere it to the object 4. In alternate embodiments, the inner seal member 26 might not be cup-shaped, and could be substantially flat, if so desired, even when the object is not installed in the object carrier 8. In the illustrated embodiment, the periphery of the controlled pressure zone 40 is defined by a circular ring of contact where an axially protruding outer rim 42 of the inner seal member 26 makes suction contact with the object 4.

As shown in FIG. 6, and as also depicted in FIG. 3, a shallow circular pocket 12A may be formed in the front side of the vacuum release actuator 12. The pocket 12A is centered about an opening 32 in the vacuum release actuator 12 that seats the anchor member hub 30. The depth of the pocket 12A is selected so as to accommodate the inner seal member 26 as it becomes flattened by the object 4 when it is installed in the object holder 2.

The vent port 28 has an outer end 28A in fluid communication with the outer controlled pressure zone 34 and an inner end 28B in fluid communication with the inner controlled pressure zone 40. When the outer seal member 24 is in suction contact with the reference surface 6, and the inner seal member 26 is in suction contact with the object 4, the interconnecting vent port 28 provides an air pathway between the outer controlled pressure zone 34 and the inner controlled pressure zone 40. The vent port 28 thus equalizes the air pressure in the two controlled pressure zones 34/40. Notwithstanding this equalization of air pressure, the suction force generated by the outer seal member 24 against the reference surface 6 will be significantly larger than the suction force generated by the inner seal member 26 against the object 4. This is because the area of the outer seal member 24 that lies within its medial rim 36 is substantially larger than the area of the inner seal member 26 that lies within its outer rim 42. For example, if the diameter of the inner seal member's rim 42 is 1 cm and the diameter of the outer seal member's rim 36 is 5 cm, the outer seal member's rim diameter will be five times larger than the inner seal member's rim diameter. However, the surface area, and hence the suction force, is based on the square of the relative diameters. As such, in the example given, the suction force generated by the outer seal member 24 will be twenty-five times larger than the suction force generated by the inner seal member 26. As will described below, this suction force differential dictates the operational characteristics of the object holder 2.

Figure 8A:
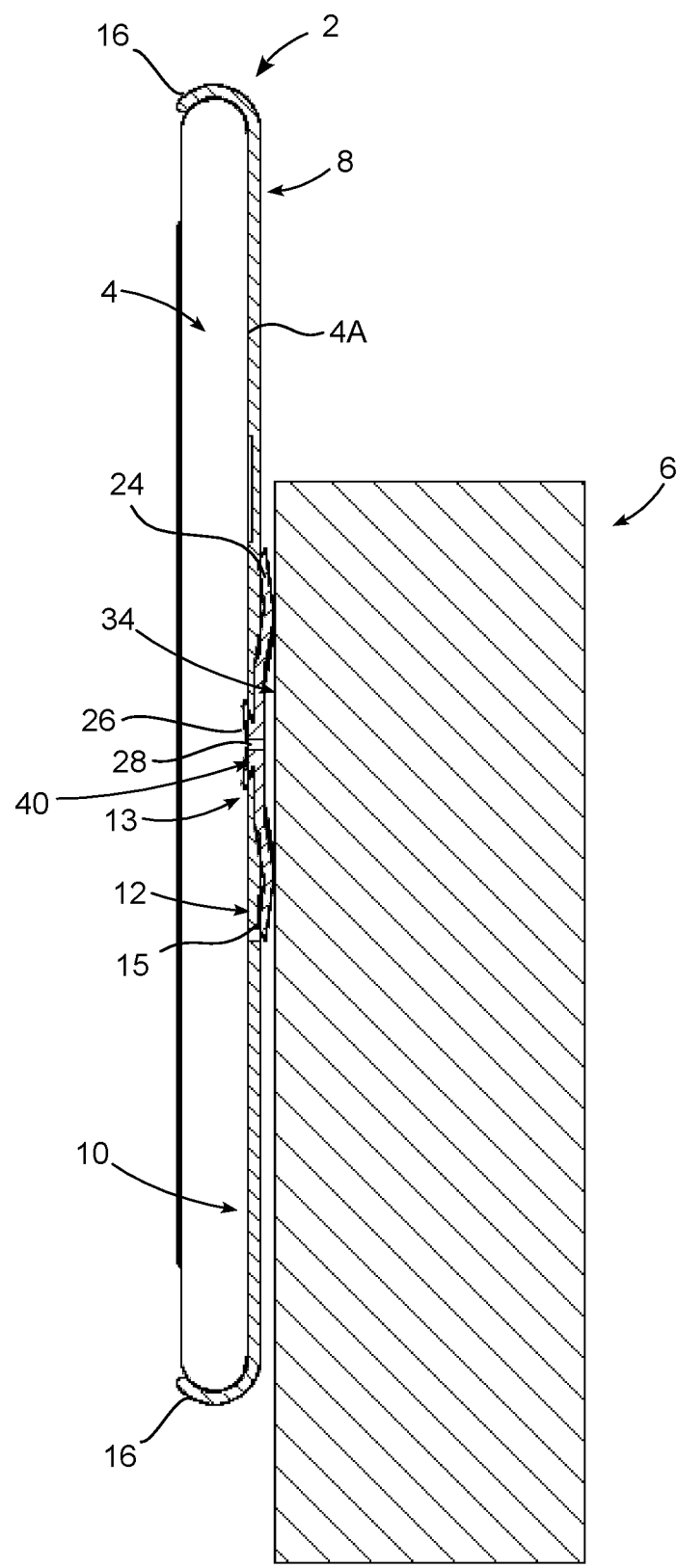
FIG. 8A is a cross-sectional view taken along line 8-8 in FIG. 1, showing the object holder and the object held thereby being mounted to the reference surface.

With reference now to FIGS. 8A-8D, the object holder 2 is shown in FIG. 8A as being in a mounted state wherein it holds the object 4 and mounts it to the reference surface 6. The mounted state of FIG. 8A may be effected by initially installing the object 4 in the object carrier 8. This installation will place the back side 4A of the object 4 in sealing engagement with the inner seal member 26. If the inner seal member 26 is cup-shaped, as in the illustrated embodiment, the process of installing the object 4 in the object carrier 8 may tend to deform the inner seal member as a result of pressing the object against it. In that case, the inner seal member 26 may become partially or wholly axially compressed (i.e., flattened). This flattening is illustrated in FIG. 8A.

Once the object 4 is installed in the object carrier 8, the object holder 2 may be mounted to the reference surface 6 by maneuvering it in a manner that pushes the outer seal member 24 into sealing engagement with the reference surface. If the outer seal member 24 is cup-shaped, as in the illustrated embodiment, the pushing force applied to the object holder 2 to maneuver the outer seal member into sealing engagement with the reference surface 6 may tend to deform the outer seal member. In that case, the outer seal member 24 may become partially or wholly axially compressed (i.e., flattened). This flattening is illustrated in FIG. 8A.

Once the object holder 2 carrying the object 4 is mounted to the reference surface 6 in the manner described above, a suction force will have been established that holds the object holder in position. The outer controlled pressure zone 34 will become sealed by virtue of the sealing engagement between the outer seal member 24 and the reference surface 6. The inner controlled pressure zone 40 will become sealed by virtue of the sealing engagement between the inner seal member 26 and the object 4.

Letting go of the object holder 2 following mounting will result in a restorative spring-back force developing in the outer seal member 24 to the extent that it was compressibly deformed during the mounting process. This restorative spring-back force will tend to increase the volume of the outer controlled pressure zone 34. In addition, the weight of the object holder 2 and the object 4 will likewise deform the outer seal member 24 in a manner that tends to increase the volume of the outer controlled pressure zone 34. Because the outer controlled pressure zone 34 is in fluid communication with the inner controlled pressure zone 40 by virtue of the interconnecting vent port 28, a negative pressure differential will collectively develop in both controlled pressure zones with respect to the external ambient air pressure outside the controlled pressure zones. This negative pressure differential will provide a suction force between the outer seal member 24 and the reference surface 6, and between the inner seal member 26 and the object 4. The object holder 2 carrying the object 4 may thereby remaining affixed to the reference surface 6 for an indefinite period of time.

When it is desired to detach the object holder 2 from the reference surface 6, the object holder 2 can be grasped and maneuvered away from the reference surface. Doing so will displace the vacuum release actuator 12 relative to the object carrier base 10, as shown in FIG. 8B. The displacement of the vacuum release actuator 12 relative to the object carrier base 2 results from the strong suction force between the outer seal member 24 and the reference surface 6. This suction force results acts on the anchor member 13, and therefore also acts on the vacuum release actuator 12 to which the anchor member is mounted. Because the vacuum release actuator 12 is displaceable relative to the object carrier base 10, the object carrier base can move away from the reference surface while the vacuum release actuator 12 and the anchor member 13 do not. In the illustrated embodiment wherein the vacuum release actuator 12 is formed as a flap, the resultant displacement of the vacuum release actuator relative to the object carrier base 10 is depicted in FIG. 8B as a slight out-of-plane bending or pivoting of the vacuum release actuator. Notwithstanding such displacement, the inner seal member 26 will tend to remain attached to the object 4 so long as the suction force between the inner suction member and the object is not exceeded.

Figure 8D:
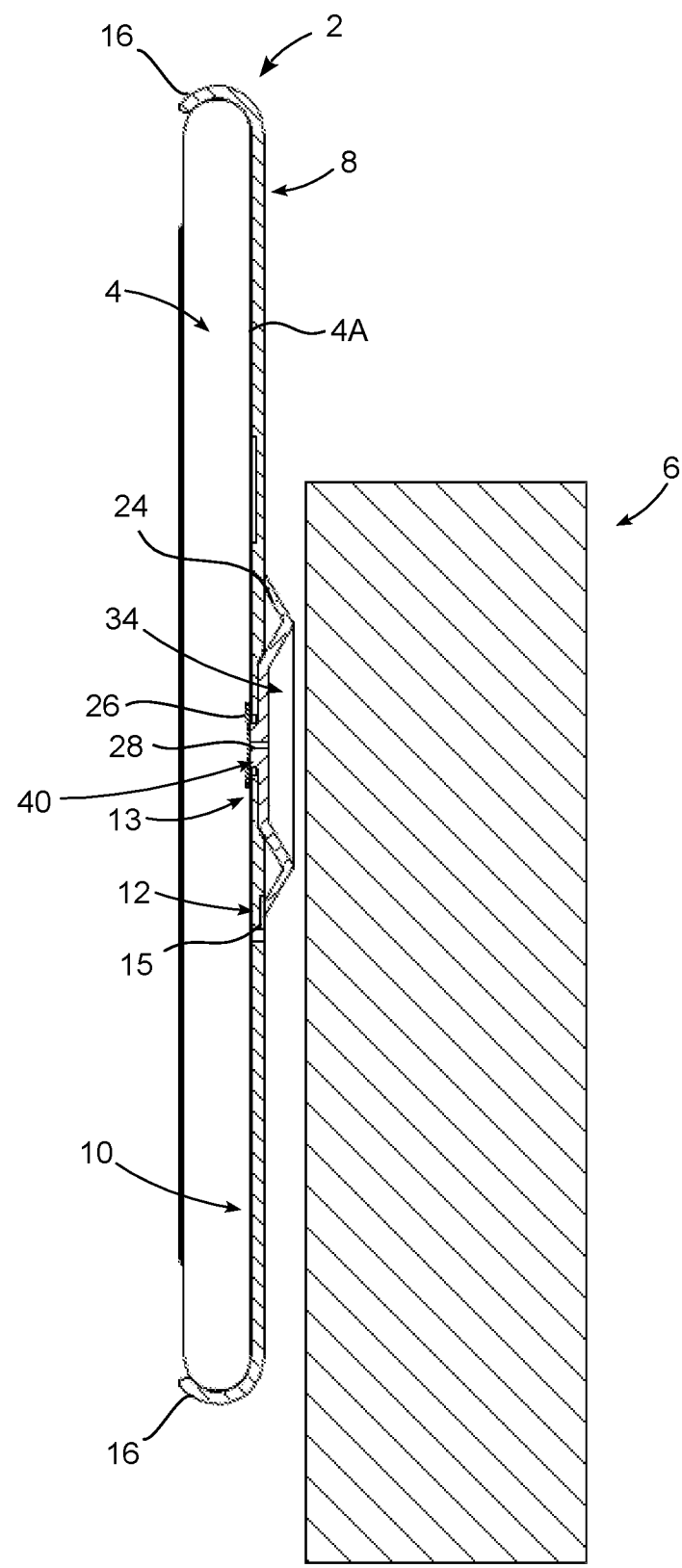
FIG. 8D is a cross-sectional view corresponding to FIG. 8A, showing a third stage of object holder detachment in which the object holder and the object held thereby have been completely detached from the reference surface.
Figure 9:
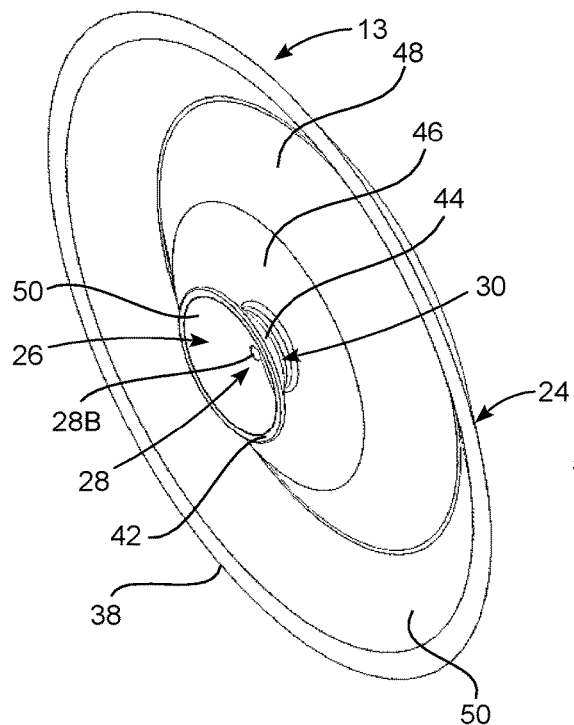
FIG. 9 is a front perspective view of an anchor member of the object holder of FIG. 1.
Figure 10:
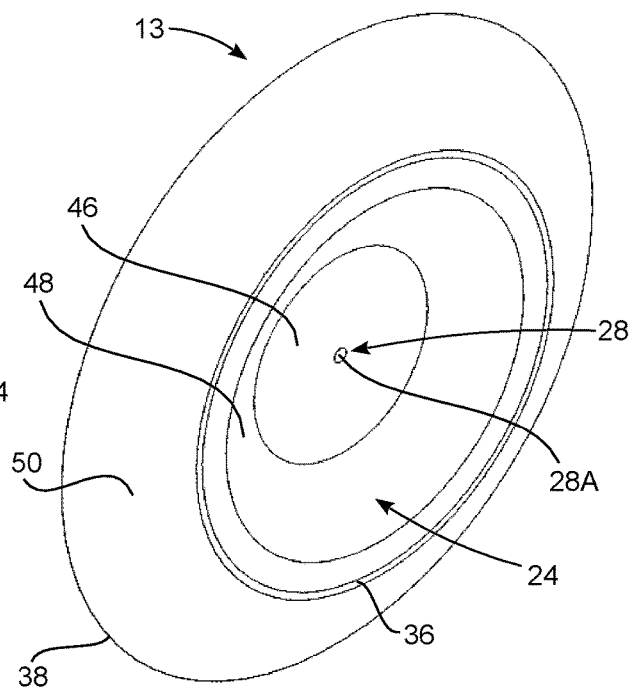
FIG. 10 is a rear perspective view of the anchor member of FIG. 9.
Figure 11:
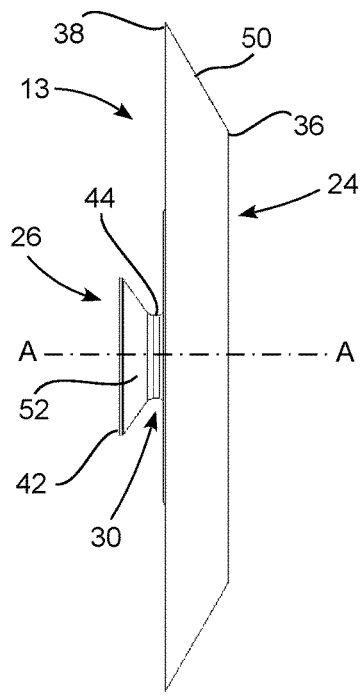
FIG. 11 is a side elevation view of the anchor member of FIG. 9.

FIG. 8C depicts a further point in the detachment process in which the object holder 2 has been maneuvered further away from the reference surface 6. In particular, the object holder 2 has been maneuvered to the point where the suction force between the inner seal member 26 and the object 4 is exceeded. When this occurs, the inner seal member 26 breaks its substantially airtight seal with the object 4. This vents the inner controlled pressure zone 40, which in turn vents the outer controlled pressure zone 34 through the interconnecting vent port 28. As a result, the negative differential pressure previously established in the outer controlled pressure zone 34 is lost, and the suction force between the outer seal member 24 and the reference surface 6 is released. As shown in FIG. 8D, the object holder 2 will now easily separate from the reference surface 6 without discernible resistance.

Turning now to FIGS. 9-12, certain features of the anchor member 13 that affect operation of the object holder 2 will be described in more detail. In particular, it will be seen clearly that the outer seal member 24 and the inner seal member 26 of the anchor member 13 are configured as simple suction cup (or suction seal) members whose walls extend continuously radially outwardly, and never radially inwardly, when moving from their respective points of attachment to the anchor member hub 30 to their respective peripheral edges and rims.

Although not shown, alternative embodiments of the anchor member 13 could incorporate seal members having one or more wall sections that converge radially inwardly as they emanate from the hub 30. However, seal members configured in such a manner are not used in the illustrated embodiment because they tend to produce in an "accordion" configuration that can promote excessive axial elongation/contraction capability. This accordion effect is facilitated by the ability of the radially-inwardly converging seal member wall section(s) to fold radially inwardly and then subsequently unfold. If the vent port is large enough, a radially inwardly-converging wall section could even fold into the vent port, thereby reversing that wall section's axial orientation. See, e.g., the patents of Lan (U.S. Pat. No. 4,756,497 and CN1079886A).

Excessive axial elongation of a seal member, and particularly an inner seal member, could result in an object holder that feels noticeably stretchable when an attempt is made to remove it from a reference surface. Such stretchability may be acceptable, or even desirable, for a holding vessel that contains a spillable liquid. If such a holding vessel is mounted on a horizontal reference surface, the increased stretchiness provided by a folding seal member may allow the vessel to rock back and forth without detaching from the reference surface, thereby resisting tipping. See, e.g., Lan (U.S. Pat. No. 4,756,497) and Lan (CN1079886A).

However, for the object holder 2, which is designed to hold a solid object, such as a smartphone or other handheld electronic device, it is preferable that minimal movement and effort be required to detach the object holder from both the object 4 and the reference surface 6. This can be achieved by controlling the axial elongation capability of at least the inner seal member 26 to ensure that it can quickly separate from the object 4. Optionally, the axial elongation capability of the outer seal member 24 may also be restricted. For the object holder 2, as constructed in accordance with the illustrated embodiment, a slight outward pull away from the reference surface 2 (e.g., 1 cm or less) is all that is required to detach the object holder.

The hub 30 of the anchor member 13 is formed as a short and stubby tubular member that is comparatively axially incompressible and non-elongatable as compared to the outer seal member 24 and the inner seal member 26. This is particularly true for the relatively axially-deformable peripheral portions of the outer seal member 24 (i.e., the medial rim 36 and the outer edge 38) and the peripheral portion of the inner seal member 26 (i.e., the outer rim 42).

Figure 12:
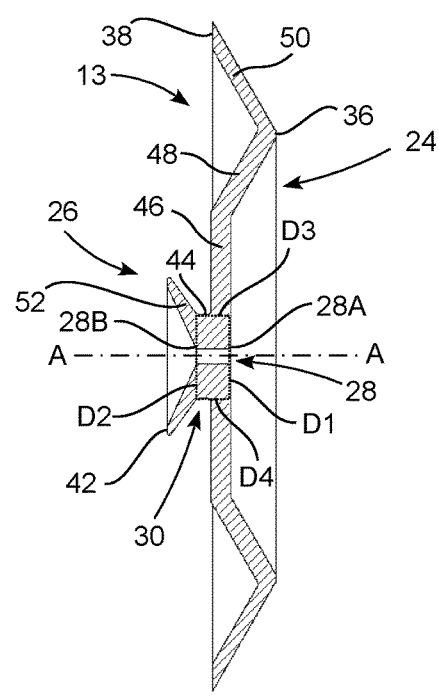
FIG. 12 is a vertical cross-sectional centerline view of the anchor member of FIG. 9.

The central through-bore of the tubular hub 30 is formed by the vent port 28. In FIG. 12, the boundaries of the hub 30 are indicated by the dashed reference lines "D1," "D2," "D3" and "D4." Reference line D1 represents the outer axial end of the hub 30. This outer end D1 is axially co-located with the outer end 28A of the vent port 28. Reference line D2 represents the axial inner end of the hub 30. This inner end D1 is axially co-located with the inner end 28B of the vent port 28. The axial length of the hub 30 is thus defined by the length of the vent port 28. The radial width of the hub 30 is indicated by the reference lines D3 and D4, which are aligned with an exposed outer cylindrical wall 44 of the hub that extends between the outer seal member 24 and the inner seal member 26 in the illustrated embodiment. The outer cylindrical wall 44 is the portion of the hub 30 that inserts through the opening 32 formed in the vacuum release actuator 12. As can be seen in FIG. 12, the hub 30 is considered to be short and stubby due to its axial length being not more than 50% of its radial width in the illustrated embodiment. Other length-to-width ratios may also be used.

With continuing reference to FIG. 12, outer end D1 of the hub 30 carries the outer seal member 24, and functions as a central stem thereof that is axially-immobilized with respect to the vacuum release actuator 12 when the anchor member 13 is mounted thereto. Extending radially outwardly from the hub 30 is an inboard section 46 of the outer seal member 24 that is disk-shaped in the illustrated embodiment (with other shapes also being possible). The inboard section 46 of the outer seal member 24 is integrally formed on the hub 30 at the hub's outer end D1. Extending both radially outwardly and axially rearwardly from the inboard section 46 is a medial section 48 of the outer seal member 24 that has a frustoconical wall configuration in the illustrated embodiment, with the large end of the frustum facing axially away from the hub 30. The medial section 48 extends to the medial rim 36 of the outer seal member 24 that engages the reference surface 6. The medial section 48 is angled with respect to the inboard section 46 so as to define the rear-facing cup shape of the outer seal member 24 that opens away from the vacuum release actuator 12 and toward the reference surface 6. Extending both radially outwardly and axially forwardly from the medial section 48 is an outboard section 50 of the outer seal member 24 that has a frustoconical wall configuration in the illustrated embodiment, with the large end of the frustum facing axially toward the hub 30. The outboard section 50 extends to the outer edge 38 of the outer seal member 24. The outboard section 50 is angled with respect to the medial section 48 so as to define a front-facing cup that opens away from the reference surface 6 and toward the vacuum release actuator 12.

Figure 13A:
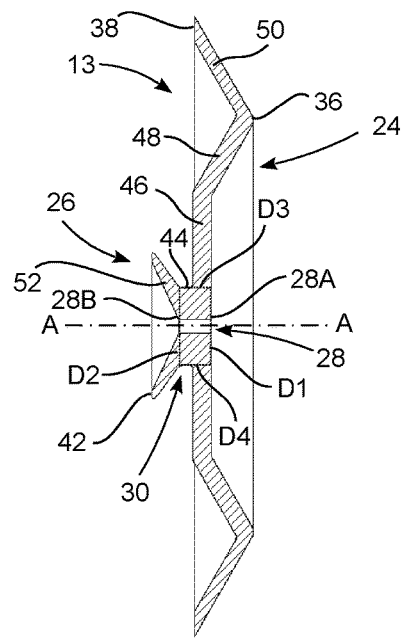
FIG. 13A is a vertical cross-sectional centerline view of the anchor member of FIG. 9 in a nominal non-deformed configuration.
Figure 13B:
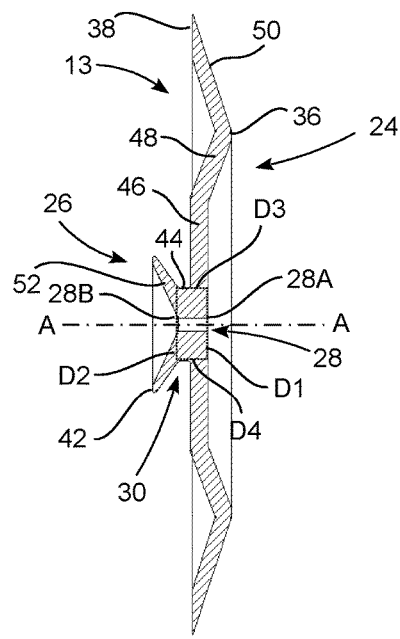
FIG. 13B is a vertical cross-sectional centerline view of the anchor member of FIG. 9 showing the anchor member's outer seal member in an axially compressed configuration.
Figure 13C:
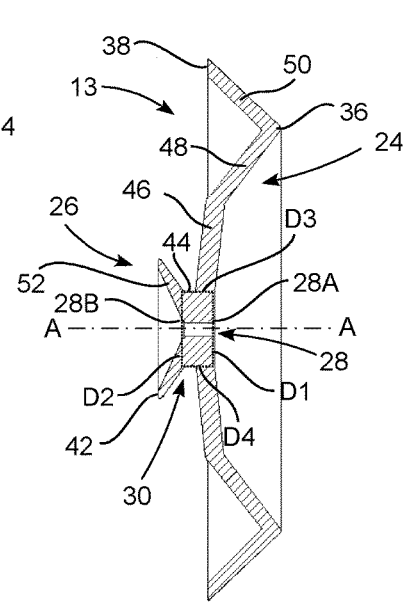
FIG. 13C is a vertical cross-sectional centerline view of the anchor member of FIG. 9 showing the anchor member's outer seal member in an axially elongated configuration.

FIGS. 13A, 13B and 13C illustrate example deformations of the outer seal member 24 that may be experienced during operation of the object holder 2. FIG. 13A depicts the nominal configuration of the outer seal member 24 without deformation. FIG. 13B depicts an axially compressed (flattened) configuration of the outer seal member 24 such as might be experienced when the object holder 2 is pressed against the reference surface 6. FIG. 13C depicts an axially elongated (tented) configuration of the outer seal member 24 such as might be experienced when the object holder 2 is pulled away from the reference surface 6 while the anchor member 13 remains adhered thereto. In both FIGS. 13B and 13C, it will be seen that the central stem of the outer seal member 24 remains axially stable as a result of the hub 30 maintaining its initial configuration. Only the peripheral portion of the outer seal member 24 that defines its cup configuration will deform, either flattening in FIG. 13B or elongating in FIG. 13C. In the axially compressed configuration of FIG. 13B, the medial section 48 and the outboard section 50 of the outer seal member 24 become less conical, and thus flatter. The inboard section 46 retains its initial disk-shaped configuration. In the axially elongated configuration of FIG. 13C, the inboard section 46 of the outer seal member 24 flexes out of plane, becoming somewhat conical so as to resemble a beveled washer. The medial section 48 of the outer seal member 24 becomes more conical in FIG. 13C, while the outboard section 50 tends to maintain its initial configuration.

Returning now to FIG. 12, inner end D2 of the hub 30 carries the outer seal member 24 and functions as a central stem thereof that is axially-immobilized with respect to the vacuum release actuator 12 when the anchor member 13 is mounted thereto. Extending both radially outwardly and axially frontwardly from the hub 30 is a main section 52 of the inner seal member 26 that has a frustoconical wall configuration in the illustrated embodiment, with the large end of the frustum facing axially away from the hub 30. The main section 52 of the inner seal member 26 is integrally formed on the hub 30 at the hub's inner end D2. The main section 52 extends linearly to the outer rim 42 that contacts the object 4 during use of the object holder 2. It is angled with respect to the hub 30 so as to define the front-facing cup shape of the inner seal member 26 that opens away from the vacuum release actuator 12 and toward the object 4. It will be seen in FIG. 12 that the thickness of the inner seal member's main section 52 may decrease toward the outer rim 42, such that the main section has a tapered conical wall. This tapering makes the outer rim 42 of the inner seal member 26 more pliable, and thus better able to form an airtight seal against the object 4.

Figure 14A:
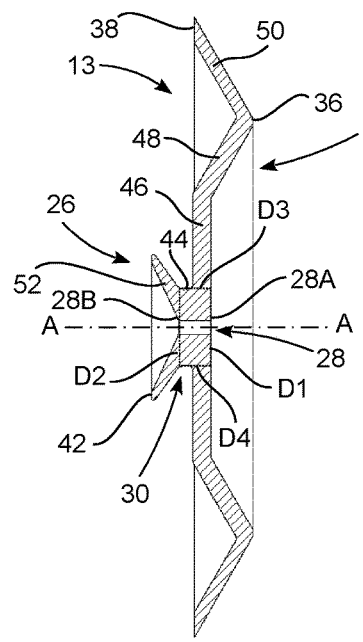
FIG. 14A is a vertical cross-sectional centerline view of the anchor member of FIG. 9 in a nominal non-deformed configuration.
Figure 14B:
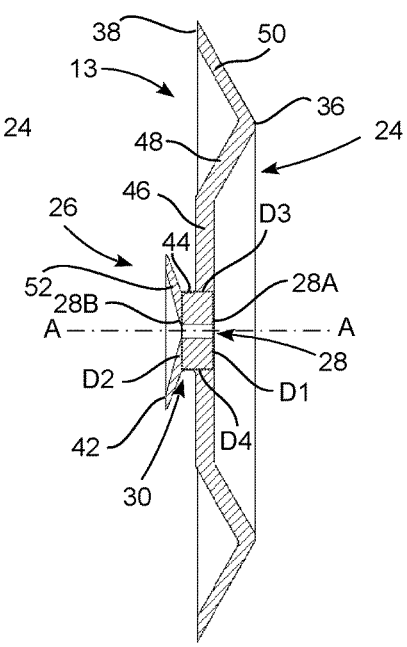
FIG. 14B is a vertical cross-sectional centerline view of the anchor member of FIG. 9 showing the anchor member's inner seal member in an axially compressed configuration.
Figure 14C:
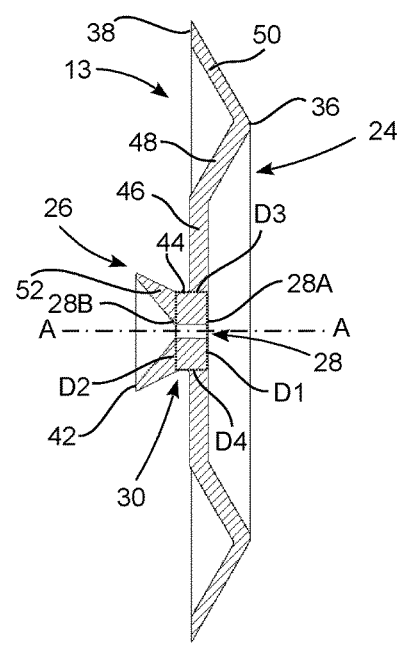
FIG. 14C is a vertical cross-sectional centerline view of the anchor member of FIG. 9 showing the anchor member's inner seal member in an axially elongated configuration.

FIGS. 14A, 14B and 14C illustrate example deformations of the inner seal member 26 that may be experienced during operation of the object holder 2. FIG. 14A depicts the nominal configuration of the inner seal member 26 without deformation. FIG. 14B depicts an axially compressed (flattened) configuration of the inner seal member 26 such as might be experienced when the object 4 is installed in the object holder 2. FIG. 14C depicts an axially elongated (tented) configuration of the outer seal member 24 such as might be experienced when the object 4 is installed in the object holder 2, the object holder is adhered to the reference surface 6, and the object holder is then pulled away from to the reference surface while the anchor member 13 remains adhered thereto. In both FIGS. 14B and 14C, it will be seen that the central stem of the inner seal member 26 remains axially stable as a result of the hub 30 maintaining its initial configuration. Only the peripheral portion of the inner seal member 26 that defines its cup configuration will deform, either flattening in FIG. 14B or elongating in FIG. 14C. In the axially compressed configuration of FIG. 14B, the main section 52 becomes less conical, and thus flatter. In the axially elongated configuration of FIG. 14C, the main section 52 of the inner seal member 26 flexes, becoming more conical.

As a result of the above-described construction of the anchor member 13, the outer seal member 24 and the inner seal member 26 each have an axially stable stem provided by the hub 30. The outer seal member 24 and the inner seal member 26 further include flexible cup-shaped peripheral portions that are anchored at the hub and extend continuously radially outwardly to circular sealing surfaces that are configured to form airtight seals (i.e. the medial rim 36 of the outer seal member and the outer rim 42 of the inner seal member). The cup-shaped peripheral portion of each seal member 24 and 26 can axially extend and compress. This occurs primarily as a result of the sections that constitute each seal member's peripheral portion becoming more or less conical. Again, these are the inboard section 46 and the medial section 48 of the outer seal member 24 that extend from the hub 30 to the medial rim 36, and the main section 52 of the inner seal member 26 that extends from the hub 30 to the outer rim 42.

Although alternate embodiments may differ, there are no seal member sections in the illustrated embodiment of the object holder 2 that converge radially inwardly when moving away from their respective points of attachment to the anchor member hub 30 to their respective peripheral edges and rims. As previously noted, this would provide an accordion configuration that could result in excessive seal member elongation/contraction capability due the ability of the radially-inwardly converging seal member wall section(s) to fold radially inwardly and then subsequently unfold, with each folding and unfolding cycle possibly reversing the axial direction of the wall section if there is sufficient clearance to do so. In the illustrated embodiment of the object holder 2, the anchor member 13 does not utilize walls that are radially inwardly-converging (or otherwise foldable).

Because the inner seal member 26 is designed to separate from the object 4 before outer seal member 24 separates from the reference surface 6, limiting axial elongation may be more important for the inner seal member than the outer seal member. Limiting axial elongation may in fact be optional as to the outer seal member 24 for some applications of the object holder 2. Therefore, as a general design guideline, it is considered that at least the inner seal member 26, and optionally the outer seal member 24, may have a substantially non-folding configuration that prevents axial elongation that would otherwise occur as result of seal member unfolding during operation of the object holder. More particularly, at least the inner seal member 26, and optionally the outer seal member 24, may have a substantially non-folding configuration in which no portion of the seal member folds radially inwardly upon itself during operation of the object holder 2. Still more particularly, at least the inner seal member 26, and optionally the outer seal member 24, may be substantially free of radially inwardly-extending sections when moving from the hub 30 to the sealing surface that forms the substantially airtight seal associated with that seal member. Still more particularly, at least the inner seal member 26, and optionally the outer seal member 24, may be implemented as a non-foldable seal member whose peripheral portions extend substantially continuously radially outwardly from the hub 30 to the sealing surface that forms the substantially airtight seal associated with that seal member.

Accordingly, an object holder with quick-release anchoring capability has been disclosed. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples have been given throughout this description. These examples are merely descriptions of specific embodiments of the invention. The scope of the claimed subject matter is not limited to the examples given.

As used herein, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternate embodiments could be implemented in accordance with the present disclosure. It is understood, therefore, that the invention is not to be limited except in accordance with the appended claims and equivalents thereof.

What is claimed is:

1. An object holder with releasable anchoring capability, comprising:
    an object carrier configured to hold an object while maintaining a fixed positional relationship therewith, the object carrier including an object carrier base;
    a vacuum release actuator disposed on the object carrier base and being displaceable relative to the object carrier base in order to separate from the object along an axis that extends normal to a reference surface;
    an anchor member carried by the vacuum release actuator;
    the anchor member including an outer seal member, an inner seal member, a hub on which the outer seal member and the inner seal member are disposed, and an interconnecting vent port extending through the hub;
    the outer seal member being arranged to engage the reference surface and form a substantially airtight seal therewith that defines an outer controlled pressure zone, the outer controlled pressure zone including a region located between the outer seal member and the reference surface;
    the inner seal member being arranged to engage the object and form a substantially airtight seal therewith that defines an inner controlled pressure zone, the inner controlled pressure zone comprising a region located between the inner seal member and the object;
    the vent port having an outer end in fluid communication with the outer controlled pressure zone and an inner end in fluid communication with the inner controlled pressure zone;
    the hub being comparatively axially incompressible and non-elongatable relative to the outer seal member and the inner seal member;

the inner seal member having a substantially non-folding configuration that prevents axial elongation that would otherwise occur as result of seal member unfolding during operation of the object holder; and whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks the substantially airtight seal with the object.

2. The object holder of claim 1, wherein the inner seal member is substantially free of radially inwardly-extending sections when moving from the hub to a sealing surface that forms the substantially airtight seal associated with the inner seal member.

3. The object holder of claim 1, wherein the inner seal member extends substantially continuously radially outwardly from the hub to a sealing surface that forms the substantially airtight seal associated with the inner seal member.

4. The object holder of claim 3, wherein the inner seal member comprises at least one frustoconical wall section.

5. The object holder of claim 1, wherein the inner seal member comprises a cup-shaped peripheral portion.

6. The object holder of claim 1, wherein the inner seal member comprises a single main section integrally formed at one end of the hub and emanating radially outwardly from the hub and axially away therefrom.

7. The object holder of claim 6, wherein the inner seal member's single main section extends continuously radially outwardly from the hub to an outer rim that forms the substantially airtight seal associated with the inner seal member.

8. The object holder of claim 7, wherein the inner seal member's single main section comprises a cup-shaped wall.

9. The object holder of claim 7, wherein the inner seal member's single main section comprises a frustoconical wall.

10. The object holder of claim 7, wherein inner seal member's single main section comprises a wall whose thickness tapers from the hub to the outer rim.

11. The object holder of claim 1, wherein the outer seal member comprises a first section integrally formed at one end of the hub and emanating radially outwardly therefrom, the outer seal member further comprising a second section integrally formed on a periphery of the first section and emanating radially outwardly from the first section and axially away from the hub.

12. The object holder of claim 11, wherein the outer seal member's first and second sections collectively extend continuously radially outwardly from the hub to a rim on a periphery of the second section that forms the substantially airtight seal associated with the outer seal member.

13. The object holder of claim 11, wherein the outer seal member's first section is disk-shaped and the second section is frustoconical.

14. The object holder of claim 11, wherein the outer seal member's first section and second section collectively form a cup-shaped configuration.

15. The object holder of claim 11, wherein the outer seal member further includes a third section integrally formed on a periphery of the second section and emanating radially outwardly therefrom and axially toward the hub to a third section periphery that defines an outer edge of the outer seal member.

16. The object holder of claim 1, wherein the outer seal member is larger than the inner seal member, such that the outer seal member develops greater suction force than the inner seal member, and so that the inner seal member separates from the object before the outer seal member separates from the reference surface.

17. The object holder of claim 1, wherein the outer seal member is larger than the inner seal member to an extent that the outer controlled pressure zone has an surface area of not less than five times a surface area of the inner controlled pressure zone, such that the outer seal member develops not less than twenty-five times more suction force than the inner seal member, and so that the inner seal member separates from the object before the outer seal member separates from the reference surface.

18. The object holder of claim 1, wherein the object carrier comprises a smartphone case and the object is a smartphone or other handheld electronic device.

19. An object holder with releasable anchoring capability, comprising:

an object carrier configured to hold an object while maintaining a fixed positional relationship therewith, the object carrier including an object carrier base;

a vacuum release actuator disposed on the object carrier base and being displaceable relative to the object carrier base in order to separate from the object along an axis that extends normal to a reference surface;

an anchor member carried by the vacuum release actuator;

the anchor member including an outer seal member, an inner seal member, a hub on which the outer seal member and the inner seal member are disposed, and an interconnecting vent port extending through the hub;

the outer seal member being arranged to engage the reference surface and form a substantially airtight seal therewith that defines an outer controlled pressure zone, the outer controlled pressure zone including a region located between the outer seal member and the reference surface;

the inner seal member being arranged to engage the object and form a substantially airtight seal therewith that defines an inner controlled pressure zone, the inner controlled pressure zone comprising a region located between the inner seal member and the object;

the vent port having an outer end in fluid communication with the outer controlled pressure zone and an inner end in fluid communication with the inner controlled pressure zone;

the hub being comparatively axially incompressible and non-elongatable relative to the outer seal member and the inner seal member;

the inner seal member being substantially free of radially inwardly-extending sections when moving from the hub to a sealing surface that forms the substantially airtight seal associated with the inner seal member; and whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks the substantially airtight seal with the object.

20. An object holder with releasable anchoring capability, comprising:
- an object carrier configured to hold an object while maintaining a fixed positional relationship therewith, the object carrier including a substantially planar object carrier base arranged for interposition between a reference surface-facing side of the object and an external reference surface when the object is mounted to a reference surface using the object holder;
- the object carrier further including one or more object holding elements arranged on a periphery of the object carrier base to engage one or more sides of the object that do not face the reference-surface;
- a vacuum release actuator disposed on the object carrier base and being displaceable relative to the object carrier base in order to separate from the object along an axis that extends normal to the reference surface;
- an anchor member carried by the vacuum release actuator;
- the anchor member including an outer seal member, an inner seal member, a hub on which the outer seal member and the inner seal member are disposed, and an interconnecting vent port extending through the hub;
- the outer seal member being arranged to engage the reference surface and form a substantially airtight seal therewith that defines an outer controlled pressure zone, the outer controlled pressure zone including a region located between the outer seal member and the reference surface;
- the inner seal member being arranged to engage the object and form a substantially airtight seal therewith that defines an inner controlled pressure zone, the inner controlled pressure zone comprising a region located between the inner seal member and the object;
- the vent port having an outer end in fluid communication with the outer controlled pressure zone and an inner end in fluid communication with the inner controlled pressure zone;
- the hub being comparatively axially incompressible and non-elongatable relative to the outer seal member and the inner seal member;
- the inner seal member having a peripheral portion that extends substantially continuously radially outwardly from the hub to a sealing surface that forms the substantially airtight seal associated with the inner seal member; and
- whereby when the object holder holds the object and is mounted to the reference surface by virtue of the inner and outer controlled pressure zones maintaining a negative pressure differential relative to an external ambient pressure, the inner and outer controlled pressure zones can be vented by manipulating the object carrier away from the reference surface to separate the object and the vacuum release actuator until the inner seal member breaks the substantially airtight seal with the object.

* * * * *